United States Patent [19]

Ookubo et al.

[11] 4,290,318
[45] Sep. 22, 1981

[54] OPERATING MECHANISM OF A TRANSFER UNIT

[75] Inventors: Takashi Ookubo; Yukiyoshi Sasabe, both of Yokohama, Japan

[73] Assignee: Nissan Motor Co., Ltd., Yokohama, Japan

[21] Appl. No.: 107,597

[22] Filed: Dec. 27, 1979

[30] Foreign Application Priority Data

Dec. 29, 1978 [JP] Japan .................. 53-164229

[51] Int. Cl.³ .................. G05G 5/10; G05G 9/12; B60K 17/34
[52] U.S. Cl. .................. 74/477; 74/339; 74/470; 74/665 GA; 74/700; 180/247
[58] Field of Search .......... 74/339, 477, 470, 665 GA, 74/700; 180/247

[56] References Cited

U.S. PATENT DOCUMENTS

| | | | |
|---|---|---|---|
| 3,283,298 | 11/1966 | Kaiser | 180/247 X |
| 3,354,741 | 11/1967 | Johnston, Jr. et al. | 74/477 |
| 3,529,487 | 9/1970 | Dolan | 180/247 X |
| 3,747,425 | 7/1973 | MacDonald | 74/477 |

*Primary Examiner*—Allan D. Herrmann
*Attorney, Agent, or Firm*—Thompson, Birch, Gauthier & Samuels

[57] ABSTRACT

An operating mechanism of a transfer unit includes a first two wheels four wheels drive shift fork, a second high-neutral-low speed shift fork, first and second shift rods for the first and second forks, one operating lever to shift the two rods, a waiting mechanism resiliently retaining the first shift fork on the shift rod to operate the operating lever when an actual shifting of the shift fork is difficult, and means to prevent second shift rod from moving when the first shift fork is actually in two wheels drive position.

3 Claims, 10 Drawing Figures

OPERATING MECHANISM OF A TRANSFER UNIT

BACKGROUND OF THE INVENTION

The present invention relates to an operating mechanism of a transfer unit including a first and a second shift rods which are parallel with each other and axially slidably supported in a transfer case, a drive condition changeover first shift fork on the first shift rod which is shiftable between two wheels drive position and four wheels drive position, a high-neutral-low speed changeover second shift fork on the second shift rod which is shiftable between high speed, neutral and low speed positions, said shift rods having recesses corresponding to said shift positions and engageable with check balls to retain respective positions, one other recess formed on each surface of each shift rod and opposing with each other when the first shift rod is shifted to the four wheels drive position and the second shift rod is shifted to the high speed position, an interlock pin disposed between said opposing surfaces of the shift rods and extending between one surface of one shift rod and one of the other recesses of the other shift rod, said shift rods being selectively shiftable to attain any one of the high speed two wheels drive, high speed four wheels drive, neutral and low speed four wheels drive conditions.

Generally, such a transfer unit receives power from a vehicle-mounted engine through a conventional transmission mechanism and transmits the power to two wheels or to four wheels of the vehicle in a high speed or a low speed driving condition.

Conventional transfer unit of the above-mentioned type has an operating lever to effect changeover between high speed, neutral and low speed drive conditions, and another operating lever to effect changeover between two wheels and four wheels driving conditions. However, to drive such a vehicle, the driver must operate three operating levers including a shift operating lever for the transmission mechanism. Needless to say, such an operation is troublesome.

Japanese Utility Model Application Publication No. 42,495/75 discloses a transfer operating mechanism which has a sole operating lever to perform the two changeover functions.

Japanese Utility Model Application Publication No. 16,752/78 described an operating mechanism to enable shifting of operating lever even when the vehicle is running along a curved road. The operating lever can be operated in any running condition of the vehicle, and an actual changeover of the transfer unit is effected only after the vehicle begins to run straight, i.e. when the rotations of front and rear wheels becomes substantially the same. Thus, such a mechanism is called as waiting mechanism. Although each of the two known mechanisms improve operability of transfer units, other disadvantages are encountered when the both mechanisms are combined in one transfer unit.

The first mentioned mechanism has an interlock between two shift rods and a rocker lever which interengages with the shift rods to sequentially obtain by one operating lever the four positions, i.e. high speed two wheels drive, high speed four wheels drive, neutral, and low speed four wheels drive positions. When the waiting mechanism described in the second mentioned mechanism is combined with the shift rod of the first mentioned mechanism to effect shift between the four wheels and two wheels drive conditions, the interlock controls the movement of the shift rods despite actual engaging condition of the transfer unit, so that undesired engaging condition can occur. Namely, when the operating lever is shifted from the high speed two wheels drive condition to the low speed four wheels drive condition, this shift is effected through the high speed four wheels drive condition and the neutral condition. Further, when the waiting mechanism is in operation, and both shift rods move in accordance with the position of the operating lever, the transfer unit remains in the two wheels drive condition. Consequently, the operating lever is in the low speed four wheels drive condition while the actual transfer unit is in the low speed two wheels drive condition. Such a low speed two wheels drive condition is undesirable in that wheel racing may occur by an excessive unit power when the vehicle is running along muddy ground. Further, there may be applied too much torque to the drive elements, e.g., propeller shaft or differential gear, and resulting damages thereof may take place when the low speed two wheels drive condition is selected at a relatively high speed of the vehicle.

SUMMARY OF THE INVENTION

The object of the present invention is to provide an improved operating mechanism for a transfer unit of the kind mentioned above which provides advantages of the known operating mechanisms while eliminating the disadvantage, and has means to prevent the transfer unit from being selected to the low speed drive condition when the transfer unit is in the two wheels drive condition by the actuation of the waiting mechanism.

To attain this object, an operating mechanism of a transfer unit according to the present invention is characterized by said first shift fork relatively movably supported on said first shift rod, a waiting mechanism resiliently retaining said first shift fork on a predetermined position of the first shift rod, and means to prevent the second shift fork from moving when said first shift fork is in the two wheels drive position.

Thus, when the transfer unit is actually in the two wheels drive condition, the second shift fork cannot move to the low speed drive position so that undesirable two wheels low speed drive condition can not be selected even when the car driver shifts the operating lever when the former shifted condition is not completed, and the waiting mechanism waits for shifting under resilient urging force.

According to one embodiment of the present invention, the four wheels drive position of the first shift rod and low speed position of the second shift rod are arranged at end positions of the same shift direction of the rods, and said means to prevent the second shift fork from moving includes portions integrally formed on the first shift fork and the second shift rod and which are interengageable with each other.

According to another embodiment of the present invention, said means to prevent the second shift fork from moving includes a lever which is pivotably supported by the transfer case, and said lever is engageable with portions integrally formed on the first shift fork and the second shift rod.

Some embodiments of the operating mechanism of a transfer unit, according to the present invention, by way of example, will now be described with reference to the accompanying drawings.

DETAILED EXPLANATION OF PREFERRED EMBODIMENTS

Figure 1:
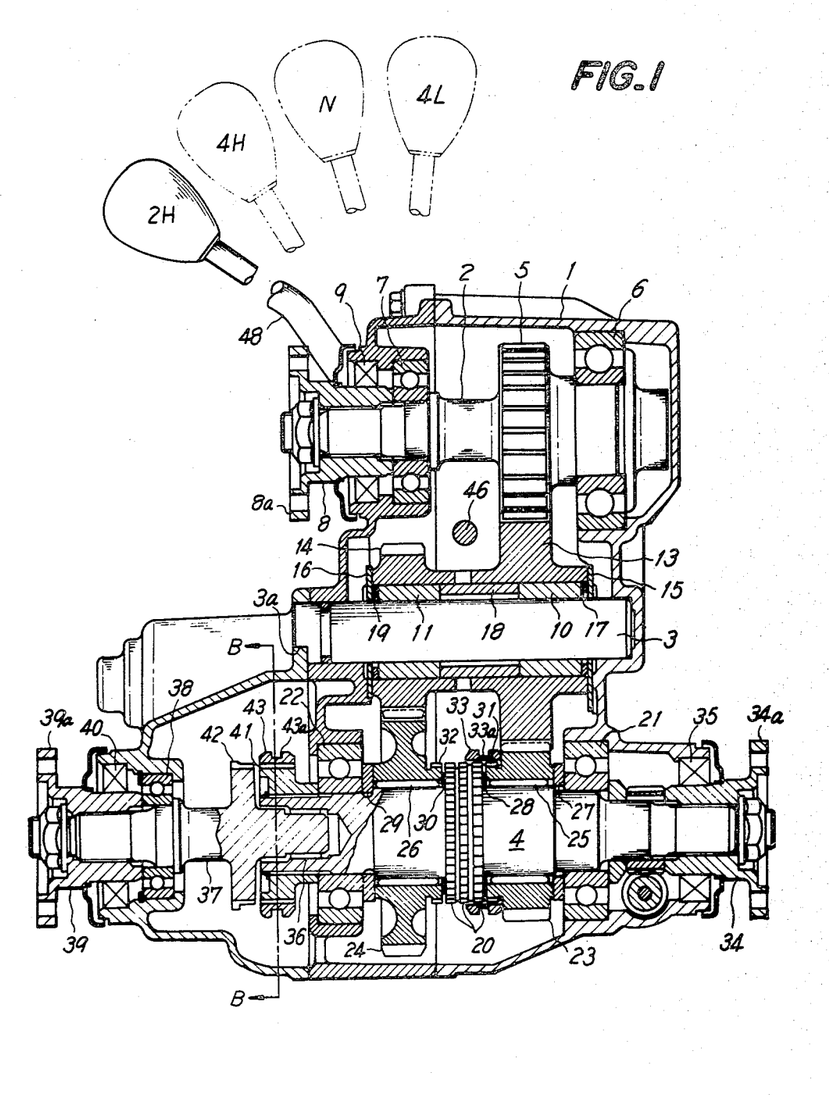
FIG. 1 is a longitudinal-sectional view of a transfer unit incorporating the mechanism according to one embodiment of the present invention.
Figure 2:
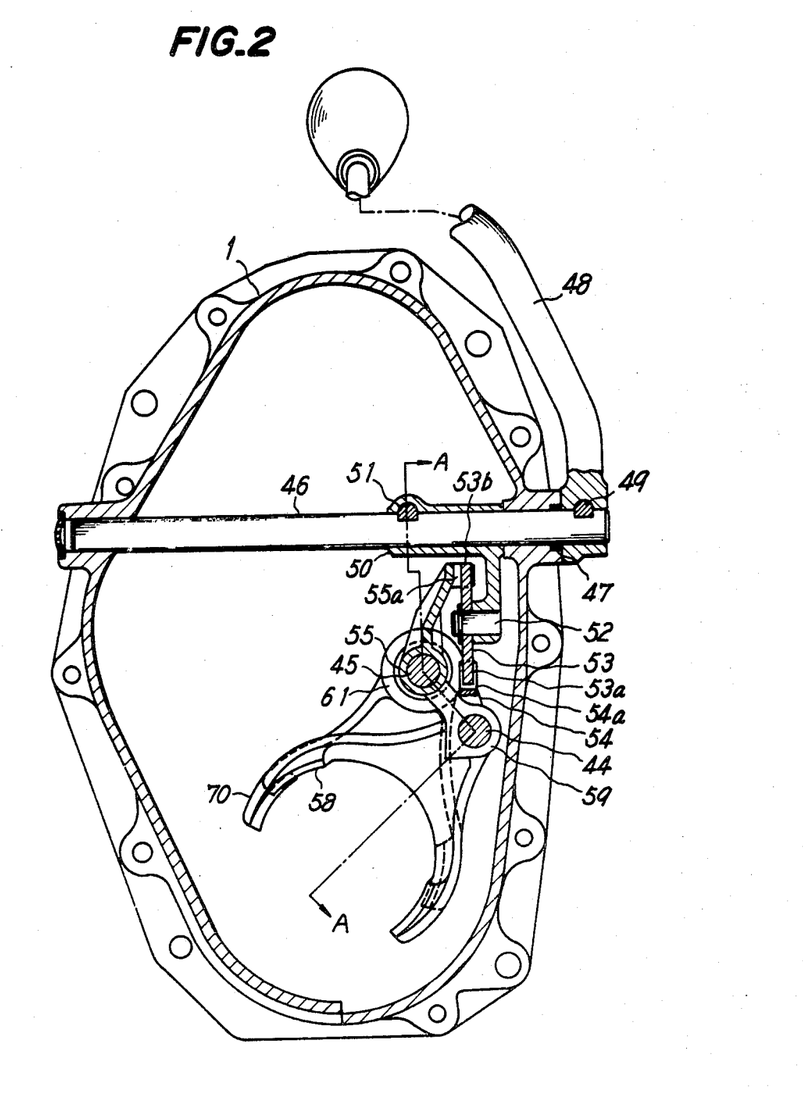
FIG. 2 is a cross-sectional view of the unit shown in FIG. 1, with the power transmission mechanism removed for a better understanding.
Figure 3:
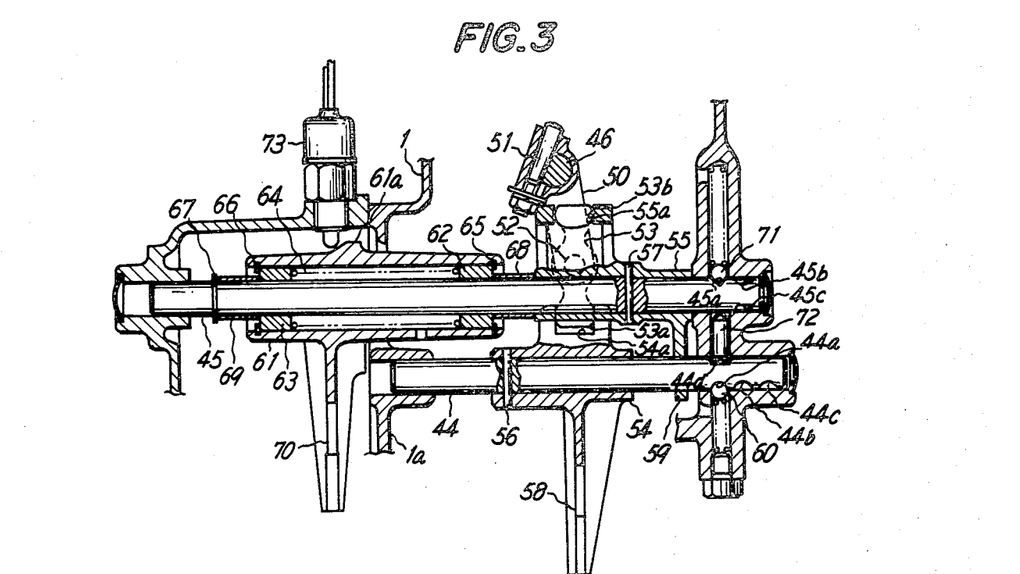
FIG. 3 is a sectional view taken along the line A—A of FIG. 2.

Referring now to FIGS. 1 to 3, reference numeral 1 designates a transfer case, in which an input shaft 2, an idler shaft 3 and an output shaft 4 are arranged in parallel with each other, as shown in FIG. 1. The input shaft 2 is integrally formed with an input gear 5 at its central portion, and is rotatably supported at its both ends by bearings 6 and 7. One end of the input shaft 2 projects out of the transfer case 1 and, a cylindrical input member 8 having on its one end a flange 8a is secured with the projected end of the input shaft 2. An oil seal 9 is inserted between the outer periphery of the input member 8 and the transfer case 1 to prevent leakage of the lubricant in the transfer case 1. The input shaft 2 receives power through the flange 8a which is connected with an output shaft 2 of a transmission, not shown, which transmits power at a selected reduction ratio from a prime mover, e.g., an engine not shown.

The idler shaft 3 has at one end a flat recess 3a which engages with a corresponding flat portion of the transfer case 1, so as to retain the idler shaft 3 against rotation. A large idler gear 13 and a small idler gear 14 are rotatably supported by the idler shaft 3 through bearings 10 and 11, respectively. The idler gears 13 and 14 are formed as an integral body which is axially positioned by thrust plates 15 and 16 at both ends. The idler gear 13 meshes with the input gear 5. The bearings 10 and 11 are axially positioned by spacers 17, 18 and 19 between the thrust plates 15 and 16.

The output shaft 4 has integrally formed output gears 20 at central position and is rotatablly supported by the transfer case 1 at both ends through bearings 21 and 22. A small diameter drive gear 23 and a large diameter drive gear 24 are rotatably supported by the output shaft 4 through needle bearings 25 and 26 at both sides of the output gears 20, respectively. The axial positions of the drive gears 23 and 24 are determined by spacers 27, 28; 29 and 30 respectively. The idler gear 13 meshes with the drive gears 23, while the idler gear 14 meshes with the drive gear 24. The drive gears 23 and 24 are integrally formed with clutch gears 31 and 32 on their end surfaces, whose diameters are the same with that of the output gears 20 and which are adjacent to the output gears 20. A coupling sleeve 33 engages with the output gears 20 permitting a relative slide movement in the axial direction. The width of the coupling sleeve is generally the same with, or slightly less than that of the output gears 20. The coupling sleeve 33 is axially movable between a high speed position engaging with the output gears 20 and the clutch gear 31 as shown in FIG. 1, a neutral position engaging only with the output gears 20 and a low speed position engaging with the output gears 20 and the clutch gear 32. At the high speed position, rotation of the input gear 5 is transmitted through the idler gear 13, the drive gear 23, the clutch gear 31, the coupling sleeve 33, the output gears 20 to the output shaft 4. At the low speed position, rotation of the input gear 5 is transmitted through the idler gear 13, idler gear 14, drive gear 24, clutch gear 32, coupling sleeve 33, output gears 20 to the output shaft 4. By the speed reduction between the gears 14 and 24, rotation speed of the output shaft 4 is reduced at the low speed position.

One end of the output shaft 4 projects out of the transfer case 1, and is integrally secured to an output member 34 formed on its end with a flange 34a, which may be connected with a propeller shaft, not shown, which drives differential gear unit for the rear wheels and acts as normal drive source. An oil seal 35 prevents leakage of the lubricant between the output member 34 and the transfer case 1. The other end of the output shaft 4 coaxially supports, through a needle bearing 36, one end of another output shaft 37. The other end of the output shaft 37 is rotatably supported through a bearing 38 by the transfer case 1, and projects out of the transfer case 1. A second output member 39 formed with a flange 39a is integrally secured to the projected end of the output shaft 37, and may be connected with a propeller shaft which drives differential unit for the front wheels acting as drive wheels in the four wheels drive condition. As oil seal 40 is inserted between the outer periphery of the output member 39 and the transfer case 1 to prevent leakage of the lubricant.

At the left end of the output shaft 4 shown in FIG. 1, a clutch gear 41 is spline connected and is held in position by a snap ring. A clutch gear 42 is formed integrally with the output shaft 37. The clutch gears 41 and 42 are coaxial and have the same diameter. Those gears 41 and 42 are engageable with a coupling sleeve 43 which is axially slidable along the gears 41 and 42. The coupling sleeve 43 is adapted to slide between a two wheels drive position shown in FIG. 1 engaging with the clutch gear 41 only, and a four wheels drive position engaging with both of the clutch gears 41 and 42.

As shown in FIGS. 2 and 3, two shift rods 44 and 45 are axially slidably supported in the transfer case 1 and are parallel with the shafts 2, 3 and 4. A cross rod 46 is rotatably supported in the transfer case 1 and extends perpendicular to the shift rods 44 and 45. One end of the shift rod 44 is supported by a partition wall 1a in the transfer case 1. One end of the cross rod 46 projects out of the transfer case 1 and is connected with a hand operation lever 48 by a cotter pin 49. An O-ring 47 seals the clearance between the cross rod 46 and the transfer case 1. In the transfer case 1, the cross rod 46 is secured with a shift lever 50 by a cotter pin 51. As the transfer case 1 is positioned between opposite end faces of the operating lever 48 and the shift lever 50, the cross rod 46 is prevented from axial movement.

Free end of the shift lever 50 is provided with a pin 52 which pivotably supports central portion of a rocking plate 53. Both ends 53a and 53b of the rocking plate 53 are rounded and engaged with rectangular recesses 54a and 55a of shift sleeves 54 and 55, respectively. The sleeves 54 and 55 are fitted with, and secured to the shift rods 44 and 45 by pins 56 and 57, respectively. The sleeve 54 is integrally formed with a shift fork 58. The sleeve 55 is integrally formed with an arm 59 (FIG. 3) which extends to and slidably engages with the shift rod 44. The arm 59, sleeve 55 and pin 57 holds the shift rod 45 against rotation. The shift fork 58 engages with an outer peripheral groove 33a of the coupling sleeve 33 shown in FIG. 1, and shifts the coupling sleeve 33 to the high speed, neutral and low speed positions. The shift rod 44 is formed with recesses 44a, 44b and 44c which engage with a check ball 60 at the high speed, neutral and low speed positions of the shift rod 44, respectively. As the shift fork 58 engages with the coupling sleeve 33, the shift rod 44 is held against rotation.

The shift rod 45 slidably supports a cylindrical member 61 through annular spacers 62 and 63 which are slidable relative to the shift rod 45 and the member 61. Between the annular spacers 62 and 63, a compression spring 64 is arranged in the member 61 to urge the spacers 62 and 63 against snap rings 65 and 66 which engage with the inner surface of the member 61 at both end portions thereof. A ring 68 is inserted between the shift sleeve 55 and the annular spacer 62, and a ring 69 is inserted between the annular spacer 63 and a snap ring 67 which engages in an annular recess on the shift rod 45. Thus, the cylindrical member 61 is resiliently retained at a predetermined axial position on the shift rod 45. The cylindrical member 61 is integrally formed with a shift fork 70 which engages with outer peripheral recess 43a of the coupling sleeve 43 shown in FIG. 1. As the shift rod 45 moves axially, the shift fork 70 shifts the coupling sleeve to the two wheels drive position or to the four wheels drive position. The shift rod 45 is formed with recesses 45a and 45b which engage with a check ball 71 at the two wheels and four wheels drive positions, respectively.

Figure 7:
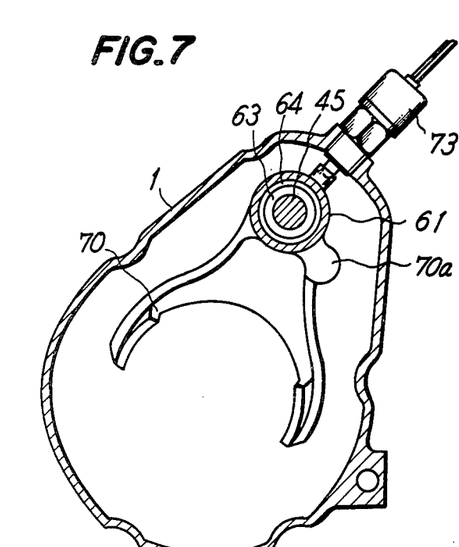
FIG. 7 is a sectional view similar to FIG. 2 and taken along the line B—B of FIG. 1, with the power transmission mechanism removed.

As shown in FIG. 7, the shift fork 70 is provided with a projection 70a which forms a portion of means to prevent the shift rod 44 from displacing to the low speed position when the waiting mechanism is in operation, as will be fully described hereinafter.

As shown in FIG. 3, an interlock pin 72 provided in the wall of the transfer case is perpendicular to and slidable between the shift rods 44 and 45. The shift rod 44 is formed with a recess 44d which engages with one end of the interlock pin 72 when the shift rod 44 is shifted to the high speed position, as shown in FIG. 3. The shift rod 45 is formed with a recess 45c which is of the same depth as the rcess 44d and engages with the other end of the interlock pin 72 when the shift rod 45 is shifted to the four wheels drive position. The length of the interlock pin 72 equals to the sum of the depth of the recess 44d or 45c and the distance between the shift rods 44 and 45 so that at least one of the recesses 44d and 45c is engaged with the interlock pin 72. Thus, when the two wheels drive position is selected as shown in FIG. 3, only high speed position can be selected by the shift rod 44.

When the shift rod 44 is moved to the neutral position, i.e. when the ball 60 engages with the recess 44b of the shift rod 44, the left end surface 44e of the shift rod 44 projects into the partition wall 1a of the transfer case 1 and opposes with the projection 70a of the shift fork 70 at the two wheels drive position shown in FIG. 3, with a small clearance between the end surface 44e and the projection 70a. This arrangement of the shift fork 70 and the shift rod 44 ensures that, when the transfer unit is in the two wheels drive position, the shift rod 44 is prevented from moving to the low speed drive position, according to the preferred embodiment of the present invention, as will be described later.

A switch 73 for detecting the four wheels drive condition is mounted on the transfer case 1, and is actuated by a projection 61a on the cylindrical member 61. When the shift rod 45 is shifted toward left in FIG. 3 from the two wheels drive position shown in FIG. 3, the cylindrical member 61 and the projection 61a also move leftwardly to actuate the detecting switch 73. Thus, a lamp in a drivers cabin indicates that the vehicle is driven in the four wheels drive condition.

Operation of the above described transfer unit having the operating mechanism according to the present invention will be described hereinafter by referring to FIGS. 3 to 8. When the vehicle is running on normal road, the driver mantains the operating lever 48 at 2H position shown by the solid line in FIG. 1. As shown in FIG. 3, the shift rod 44 is in the extreme right position where the check ball 60 engages with the recess 44a, and the shift rod 45 is also in the extreme right position where the check ball 70 engages with the recess 45a. The lower end of the interlock pin 72 engages with the recess 44d of the shift rod 44. As the shift rods 44 and 45 are in their extreme right positions, the shift forks 58 and 70 so position the coupling sleeves 33 and 43 as shown in FIG. 1, that the coupling sleeve 33 connects the output gears 20 with the clutch gear 31 while the coupling sleeve 43 meshes only with the clutch gear 41 to interrupt power transmission between the output shafts 4 and 37. Thus, power transmitted from the transmission to the input shaft 2 is further transmitted through the input gear 5, idler gear 13, drive gear 23, clutch gear 31, coupling sleeve 33, output gears 20 and the output shaft 4 to the rear two wheels, to drive the vehicle in the high speed two wheels drive condition.

When the vehicle is to be driven on muddy or off-road ground, the driver shifts the operating lever 48 from the position 2H to the next position 4H shown in FIG. 1. The cross rod 46 and the shift lever 50 rotate clockwisely from the position shown in FIG. 3 to the position shown in FIG. 4. As the shift rod 44 is prevented from shifting by interengagement between the recess 44d and the interlock pin 72, the shift rod 44 is not capable of following the rotation of the shift lever 50 which causes a counterclockwise rotation of the rocking plate 53 through the pin 52 and about the upper end 53a. Thus, the rocking plate 53 shifts the shift sleeve 55 and the shift rod 45 from the position shown in FIG. 3 toward left to the position shown in FIG. 4. The snap ring 67 on the shift rod 45 then contacts with the transfer case 1, and the check ball 71 engages with the recess 45b. The shift rod 45 maintains the new position in which the upper end of the interlock pin 72 opposes with the recess 45c. As the shift rod 45 moves toward left, the sleeve 68 and the spacer 62 compress the spring 64 which urges through the spacer 63 the shift fork 70 to the extreme left position. By this, the coupling sleeve 43 is moved toward left in FIG. 1 to mesh with the clutch gears 41 and 42. When the output shafts 4 and 37 move relative to each other, e.g. when the vehicle is running along a curved path, the internal teeth of the coupling sleeve 43 and the external teeth of the clutch gear 42 interfere with each other, so that the shift fork 70 cannot move the coupling sleeve 43 toward left. Thus, as shown by solid lines in FIG. 4, the shift fork 70 and the cylindrical member 61 remain in their original positions shown in FIG. 3. In this case, the shift rod 45, shift sleeve 55 and the sleeve 68 integrally move toward left against the spring 64, without disturbing the movement of the operating lever 48 from the 2H position to the 4H position. After the operating lever 48 is moved to the 4H position, even though the driver releases his hand from the operating lever 48, the shift rod 45 is held in the extreme left position by engaging the check ball 71 with the recess 45b against the force of the spring 64 acting toward right. The shift fork 70 waits for shifting to the 4H position by the force of the spring 64 acting toward left.

As the relative rotation between the output shafts 4 and 37 releases interference between the internal teeth of the coupling sleeve 43 and the external teeth of the clutch gear 42, the force of the spring 64 is transmitted through the annular spacer 63, snap ring 66, cylindrical member 61 and the shift fork 70 to the coupling sleeve 43. Thus, the coupling sleeve 43 moves toward left from the position shown in FIG. 1, and meshes with the clutch gears 41 and 42, to connect the output shaft 37 with the output shaft 4. The positions of the cylindrical member 61 and the shift fork 70 relative to the shift rod 45 is the same with that shown in FIG. 3 and by the phantom line in FIG. 4. By this, the shift is completed and power from the output shaft 4 is transmitted through the output shaft 37 to the front wheels, so that the vehicle is driven in the high speed four wheels drive condition.

Figure 4:
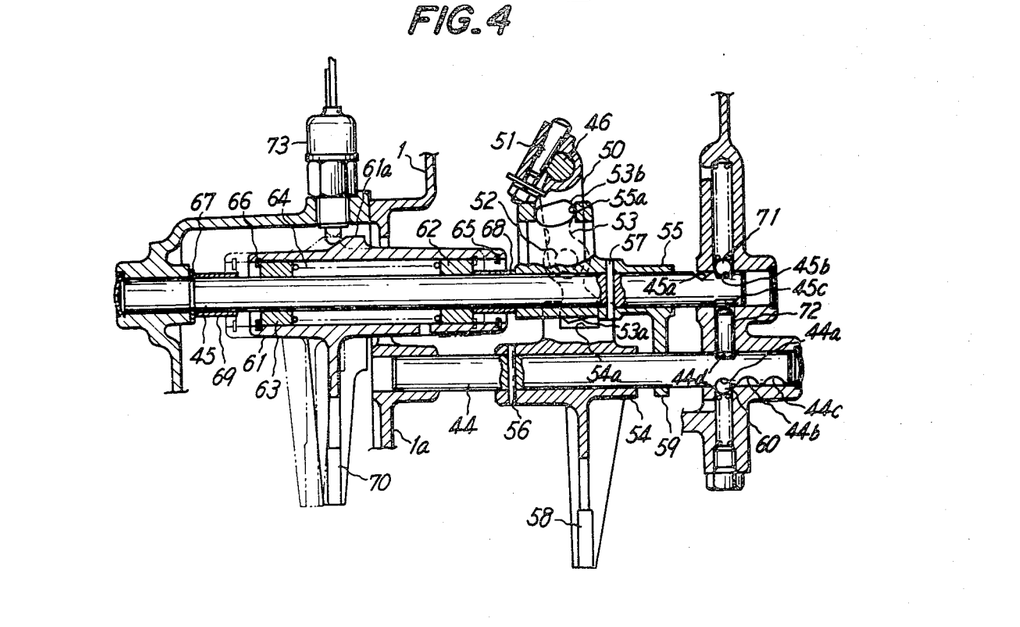
FIGS. 4 to 6 are sectional views similar to FIG. 3 and showing various shift positions.
Figure 5:
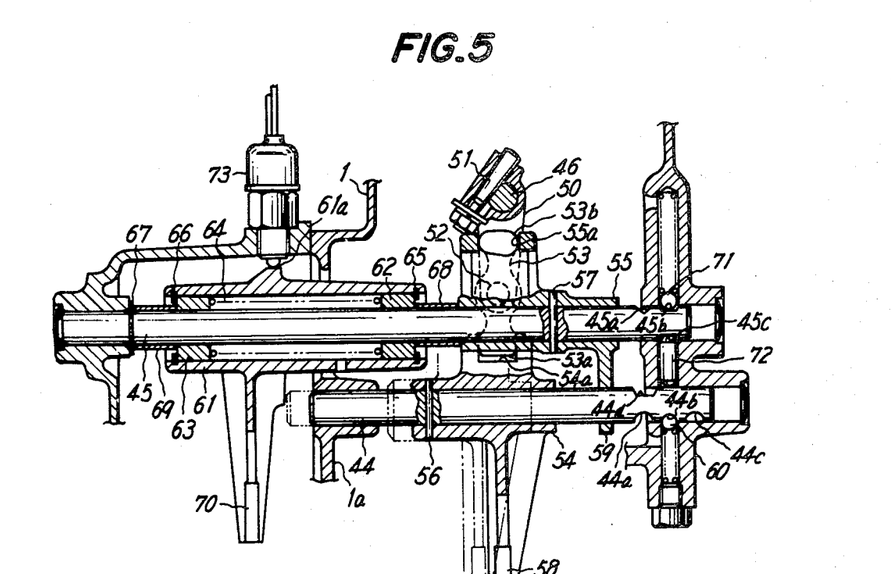
Figure 6:
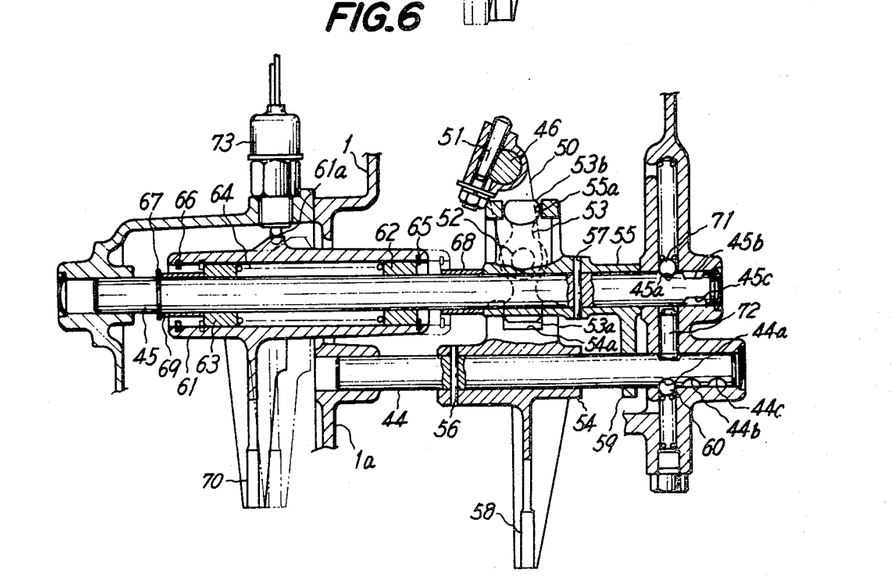

When the operation lever 48 is shifted from the position 4H to the next position N shown in FIG. 1, the shift lever 50 is rotated by the cross rod 46 clockwisely from the position shown in FIG. 4 to a position shown in FIG. 5. Since the snap ring 67 and the transfer case 1 are in abutting engagement, the shift rod 45 cannot any more follow the rotation of the shift lever 50 which causes a clockwise rocking of the rocking plate 53 through the pin 52 and about the end 53b. As shown in FIGS. 4 and 5, as the end portion 53b of the rocking plate 53 is retained by the end portion 55a of the shift sleeve 55, the end portion 53a of the rocking plate 53 displaces the shift sleeve 54 and the shift rod 44 toward left to the position shown by solid line in FIG. 5. The shift rod 44 displaces the interlock pin 72 from the recess 44d so that the other end of the interlock pin 72 engages with the recesss 45c of the shift rod 45. The shift rod 44 is then retained in position by engagement between the recess 44b and the check ball 60. As the shift rod 44 moves toward left, the shift fork 58 displaces the coupling sleeve 33 from the position shown in FIG. 1 toward left to disengage the coupling sleeve 33 from the clutch gears 31 and 33. Thus, power from the input shaft 2 is not transmitted to the output shaft 4 so that neutral condition is obtained to stop the vehicle.

When the operation lever 48 is shifted from the position N to the next position 4L shown in FIG. 1, the shift lever 50 rotates clockwisely from the position shown in FIG. 5. With the operation similar to that for obtaining the neutral position, the rotation of the shift lever 50 causes further rocking of the rocking plate 53 which displaces the shift sleeve 54 and the shift rod 44 toward left from the position shown by solid line to the position shown by phatom line in FIG. 5. By this displacement, the check ball 60 engages into the recess 44c of the shift rod 44, and the shift fork 58 displaces the coupling sleeve 33 further toward left from the neutral position to a position in which the coupling sleeve 33 engages with the clutch gear 32 of the drive gear 24. Thus, power is transmitted through the idler gear 13, idler gear 14, drive gear 24, clutch gear 32, coupling sleeve 33 and the output gears 20 to the output shaft 4, to effect power transmission at low speed compared with the positions 2H and 4H. As the coupling sleeve 43 connects the output shaft 4 with the output shaft 37 as previously stated, the vehicle is driven in low speed four wheels drive condition which is suitable for climbing steep uphill at high torque or for driving on irregular ground.

To changeover from the four wheels to two wheels drive condition, the driver shifts the operating lever 48 from the position 4H to the position 2H shown in FIG. 1. The cross rod 46 and the shift lever 50 rotates counterclockwisely from the position shown in FIG. 4 to the position shown in FIG. 6 which is identical with that shown in FIG. 3. As described previously, when the operation lever 48 is shifted to the position 4H to obtain the high speed four wheels drive condition, the coupling sleeve 33 contacts with the end surface of the drive gear 23 and cannot further move toward right. Thus, the shift fork 58 and the shift rod 44 are also retained in the position shown in FIG. 4 or 6. Thus, the counterclockwise rotation of the shift lever 50 causes through the pin 52 the clockwise rocking of the rocking plate 53 about the retained end portion 53a from the position shown in FIG. 4. Thus, the shift sleeve 55 together with the shift rod 45 is displaced to the extreme right position shown in FIG. 6 where the right end surface of the shift sleeve 55 contacts with the transfer case 1. The movement toward right of the shift rod 45 tends to urge the cylindrical member 61 and the shift fork 70 rightwardly to release the coupling sleeve 43 from the output shaft 37. But, in case the vehicle is running along a steep curve, twist torque caused by the speed difference between inner front and rear wheels is applied between the output shafts 4 and 37, and the twist torque retains the coupling sleeve 43 from moving to its released position. Thus, the shift fork 70 and the cylindrical member 61 are retained in the four wheels drive position as shown by solid line in FIG. 6 or by phantom line in FIG. 4. In this case, the shift rod 45 moves to the extreme right position and displaces the snap ring 67, sleeve 69 and the annular spacer 63 toward right against the spring 64, so that the operation lever 48 can be shifted to the position 2L. After the shifting operation, the shift rod 45 is retained by engagement of the check ball 71 with the recess 45a against the reaction force of the spring 64. Thus, the driver can release his hand from the operating lever 48. The shift fork 70 urged by the spring 64 waits for a shiftable condition to release the output shaft 37 to thereby obtain the two wheels drive condition.

When the vehicle is now running on a straight road, the twist torque between the output shafts 4 and 37 becomes zero, so that the coupling sleeve 43 can slide along the clutch gears 41 and 42 to be disengaged from the clutch gear 42. Compression force of the spring 64 is transmitted through the annular spacer 62, snap ring 65, cylindrical member 61 and the shift fork 70 to the coupling sleeve 43, and the coupling sleeve 43 moves toward right from the four wheels drive position to the two wheels drive position shown in FIG. 1. In this case, the cylindrical member 61 and the shift fork 70 also move toward right relative to the shift rod 45 to the position shown in FIG. 3 and also shown by phantom line in FIG. 6. Now the vehicle is capable of driving in the high speed two wheels driving condition.

Operation of the transfer unit, according to the present invention by sequential shifting of the operation lever 48 has been so far explained in detail referring to FIGS. 3 to 6. In the followings, operation of means to prevent the transfer unit from selecting the low speed drive condition, when the transfer unit is in the two wheels drive condition, will be described in detail referring to FIGS. 4 and 5 and FIG. 8 which shows process of shift operation from the 2H or 4H position to the 4L position.

Referring to FIG. 4, as stated previously, when the operation lever 48 is shifted to the 4H position from the 2H position and the shift fork 70 is retained in the waiting position shown by solid line in FIG. 4, the shift rod 45 may be displaced toward left and is kept in the position of FIG. 4, by means of waiting mechanism which includes the cylindrical member 61, annular spacers 62 and 63, spring 64 and snap rings 65 and 66, and resiliently urges the shift fork 70 toward left by the spring 64.

Figure 8:
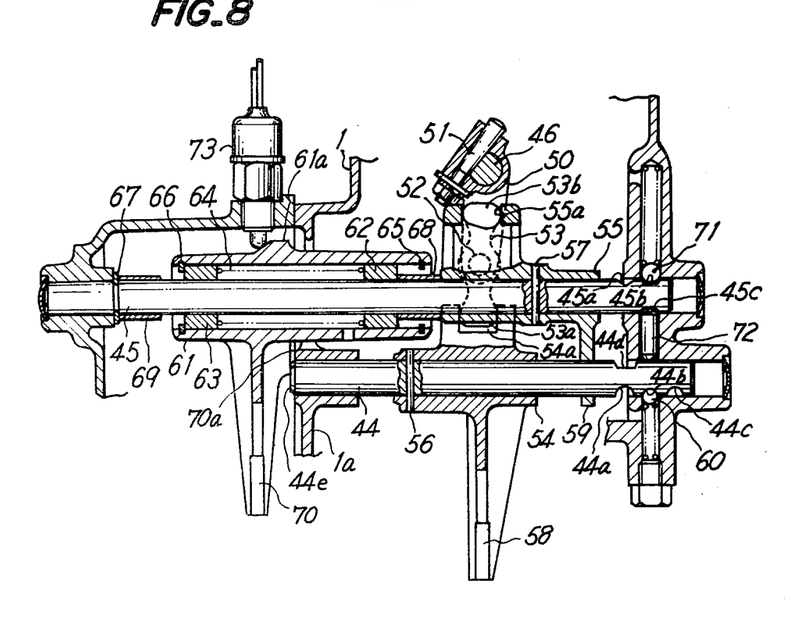
FIG. 8 is a sectional view similar to FIG. 3 showing shifting process from the 2H to 4L position.

In this condition, when the operating lever is shifted to N position shown in FIG. 1, from the solid line position shown in FIG. 4, the rocking arm 53 rocks clockwisely to move the shift rod 44 toward left until the recess 44b engages with the check ball 60, as stated previously with reference to FIG. 5. As shown in FIG. 8, the left end surface 44e of the shift rod 44 projects into the partition wall 1a of the transfer case 1, and contacts or nearly contacts with the projection 70a of the shift fork 70.

Further, when the operating lever 68 is intended to be shifted to the 4L position from the position shown in FIG. 8, to thereby shift the shift rod 44 from solid line position to phantom line position shown in FIG. 5, the left end surface 44e of the shift rod 44 contacts with the projection 70a of the shift fork 70 which is still retained in two wheels drive position. Thus, the shift rod 44 and the operating lever 48 cannot move to the 4L position when the transfer unit is actually in the two wheels drive condition.

Thus, the left end surface 44e of the shift rod 44 and the projection 70a of the shift fork 70 forms means to prevent the transfer unit from selecting the low speed drive condition when the transfer unit is actually in the two wheels drive condition.

As described, the low speed two wheels drive condition can never be accidentally or erroneously selected, so that damages of the transfer unit, propeller shaft or differential gears, as well as wheel slippage by excessive engine brake are positively prevented.

The embodiment thus far described utilizes the end surface 44e of the shift rod 44 and the projection 70a of the shift fork 70, so that other additional elements are not necessary. The cylindrical member 61 and the shift rod 44 may be integrally formed or mounted with other elements which forms similar relative positions with the end surface 44e and the projection 70a.

It will be appreciated from the foregoings that by the operating mechanism of the transfer unit, according to the above embodiment, which comprises the cross rod 46, shift lever 50, pin 52, rocking arm 53 and the shift sleeves 54 and 55, vacant space in the transfer case 1 is utilized effectively, and the mechanism can be fully arranged in the transfer case. Thus, water and dust considerations are not necessary and lubrication system for the conventional transfer unit can be used. Especially, even though twice load is applied between the rocking arm 53 and the pin 52 relative to operating load of the shift fork 58 and 70 by the lever ratio, specific lubrication system is not necessary. Thus, the mechanism is substantially maintenance free. Further, when the arrangement of gear transmission series of the transfer unit shown in FIG. 1 is combined with the operating mechanism shown in FIGS. 2 to 8, the coupling sleeves 33 and 43 can be aligned. Thus, shift pattern of the operating lever 48 can be linear facilitating the shift operation. Also, as the distance between the shift rods 44 and 45 can be decreased, and as the length of the rocking arm 53 which bridges the shift rods 44 and 45 is shortened, shift length of the operating lever 48 is decreased to attain an easy operation.

In the first embodiment shown in FIGS. 1 to 8, the shift rod 44 directly contacts with the shift fork 70 or the cylindrical member 61. When the arrangement of the elements in the transfer unit does not allow the direct contact between the shift rod 44 and the shift fork 70, the second embodiment to be described hereinafter is suitable to solve the problem of accidental or erroneous operation.

Figure 9:
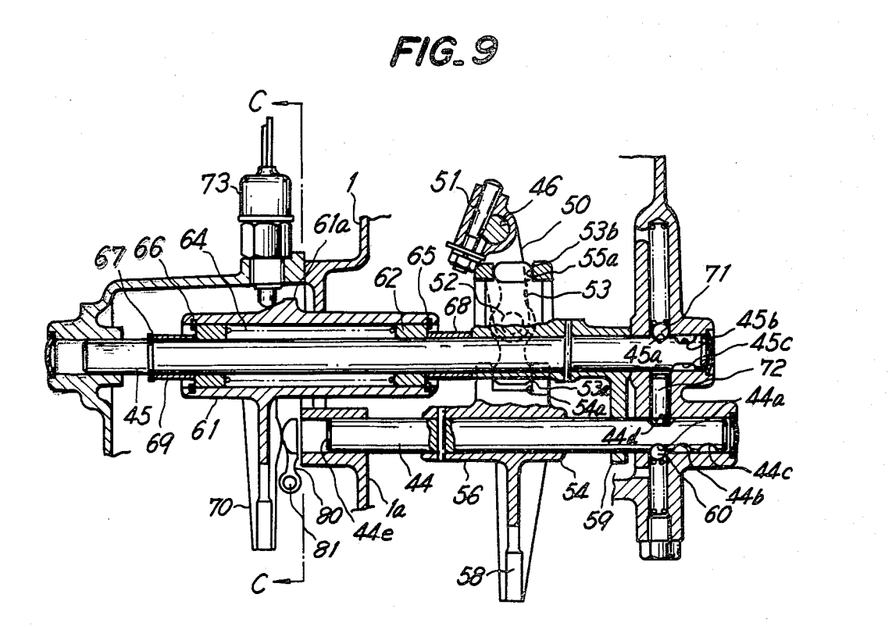
FIG. 9 is a sectional view similar to FIG. 3 showing a second embodiment of the present invention.
Figure 10:
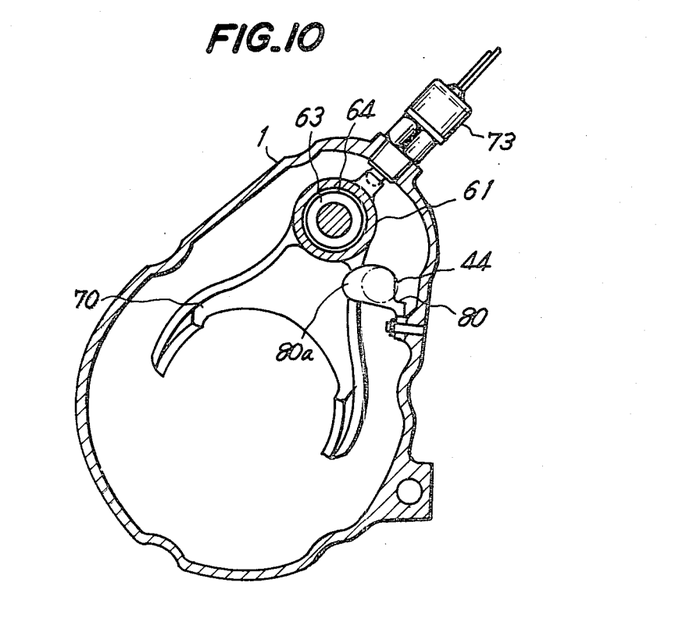
FIG. 10 is a sectional view taken along the line C—C of FIG. 9.

In the second embodiment of the present invention shown in FIGS. 9 and 10, means to prevent the transfer unit from being selected into the low speed drive condition when the transfer unit is in the two wheels drive condition, includes a lever 80 which is pivotably supported by the transfer case 1 through a pin 81 at one end. The other end 80a of the lever 80 is formed such that a portion of one side surface opposes with the lever 70 and a portion of the other side surface opposes with the end surface 44e of the shift rod 44. FIG. 9 shows the high speed two wheels drive condition of the transfer unit, which is generally similar with that of the first embodiment shown in FIG. 3, so that general operation of the transfer unit shown in FIG. 9 is not necessary.

As stated previously for the first embodiment with reference to FIG. 8, when the operating lever 48 is intended to be operated from the 4H position through the N position further to the 4L position without noticing that the shift fork 70 is retained in the two wheels drive condition, the lever 80 is engaged by the shift fork 70 which is retained in the two wheels drive position as shown in FIG. 9. The end surface 44e of the shift rod 44 is moved toward left to the N position. Thus, the operating lever 48 cannot move beyond the N position as long as the shift fork 70 is retained in the two wheels drive position by the waiting mechanism.

It will be appreciated that, by pivotably mounting the lever 80 to the transfer case 1, accidental or erroneous shifting to the two wheels low speed driving condition is effectively prevented in any shape and arrangement of the shift rods 44 and 45, coupling sleeves 33 and 43 and the shift forks 58 and 78 in the transfer unit.

In the first and second embodiments shown in the drawings, the coupling sleeves 43 and 33 are shifted to the same direction when the low speed four wheels drive condition is selected. When the coupling sleeves shift in opposite directions in other embodiment, a lever which is pivotably mounted at its center position to the transfer case by a pin may be used in place of the pin 80 which is pivotably mounted at one end.

What is claimed is:

1. An operating mechanism of a transfer unit including a first and a second shift rods which are parallel with each other and axially slidably supported in a transfer case, a drive condition changeover first shift fork on the first shift rod which is shiftable between two wheels drive position and four wheels drive position, a high-neutral-low speed changeover second shift fork on the second shift rod which is shiftable between high speed, neutral and low speed positions, said shift rods having recesses corresponding to said shift positions and engageable with check balls to retain respective positions, one other recess formed on each surface of the shift rods and opposing with each other when the first shift rod is shifted to the four wheels drive position and the second shift rod is shifted to the high speed position, an interlock pin disposed between said opposing surfaces of the shift rods and extending between one surface of one shift rod and one of the recesses of the other shift rod, said shift rods being selectively shiftable to attain any one of the high speed two wheels drive, high speed four wheels drive, neutral and low speed four wheels drive conditions, characterized by said first shift fork relatively movably supported on said first shift rod, a waiting mechanism resiliently retaining said first shift fork on a predetermined position of the first shift rod, and means to prevent the second shift fork from moving when said first shift fork is in the two wheels drive position.

2. An operating mechanism as claimed in claim 1, characterized in that the four wheels drive position of the first shift rod and the low speed position of the second shift rod are arranged at end positions of the same shift direction of the rods, and said means to prevent the second shift fork from moving includes portions integrally formed on the first shift fork and the second shift rod and which are interengageable with each other.

3. An operating mechanism as claimed in claim 1, characterized in that said means to prevent the second shift fork from moving includes a lever which is pivotably supported by the transfer case, and said lever is engageable with portions integrally formed on the first shift fork and the second shift rod.

* * * * *